(12) United States Patent
Hill

(10) Patent No.: US 8,180,805 B2
(45) Date of Patent: May 15, 2012

(54) SYSTEMS AND METHODS FOR ASSIGNING HOSTS IN RESPONSE TO A DATA QUERY

(75) Inventor: Gerhard Hill, St. Leon (DE)

(73) Assignee: SAP AG, Walldorf (DE)

( * ) Notice: Subject to any disclaimer, the term of this patent is extended or adjusted under 35 U.S.C. 154(b) by 756 days.

(21) Appl. No.: 12/230,147

(22) Filed: Aug. 25, 2008

(65) Prior Publication Data

US 2010/0049733 A1  Feb. 25, 2010

(51) Int. Cl.
  G06F 7/00 (2006.01)
  G06F 17/30 (2006.01)
  G06F 12/00 (2006.01)

(52) U.S. Cl. .................... 707/802; 707/809; 707/821

(58) Field of Classification Search .................. 707/792, 707/802, 809, 821, 953; 717/140, 153, 157, 717/159
See application file for complete search history.

(56) References Cited

U.S. PATENT DOCUMENTS

| | | | | |
|---|---|---|---|---|
| 4,571,678 A * | 2/1986 | Chaitin | | 717/156 |
| 5,249,295 A * | 9/1993 | Briggs et al. | | 717/157 |
| 5,613,198 A * | 3/1997 | Ahmadi et al. | | 370/337 |
| 6,085,216 A * | 7/2000 | Huberman et al. | | 718/104 |
| 6,090,156 A * | 7/2000 | MacLeod | | 717/157 |
| 6,408,433 B1 * | 6/2002 | Click et al. | | 717/154 |
| 7,278,137 B1 * | 10/2007 | Fuhler et al. | | 717/153 |
| 7,773,558 B2 * | 8/2010 | Cho et al. | | 370/329 |
| 7,907,508 B2 * | 3/2011 | Tao et al. | | 370/203 |
| 8,013,859 B2 * | 9/2011 | Cannon, III | | 345/440 |
| 2004/0064811 A1 * | 4/2004 | Altmejd | | 717/159 |
| 2008/0256149 A1 * | 10/2008 | Bansal et al. | | 707/206 |
| 2009/0064112 A1 * | 3/2009 | Inagaki et al. | | 717/140 |
| 2009/0081955 A1 * | 3/2009 | Necker | | 455/63.1 |
| 2009/0245086 A1 * | 10/2009 | Tao et al. | | 370/208 |

* cited by examiner

*Primary Examiner* — Don Wong
*Assistant Examiner* — Merilyn Nguyen
(74) *Attorney, Agent, or Firm* — Finnegan, Henderson, Farabow, Garrett & Dunner, LLP

(57) ABSTRACT

Systems and methods consistent with the invention may include selecting a plurality of hosts to store data structures by defining a color incidence process used to model a host assignment process, determining, by the color incidence process, a color allocation, and assigning the data structures to one of the plurality of hosts based on the color allocation determined by the color incidence process.

7 Claims, 8 Drawing Sheets

SYSTEMS AND METHODS FOR ASSIGNING HOSTS IN RESPONSE TO A DATA QUERY

BACKGROUND

1. Relevant Field

Systems and methods consistent with the present invention generally relate to the storage and management of data structures, preferably within databases. More particularly, systems and methods consistent with the invention relate to the assignment or storage of data structures in hosts in response to a database query.

2. Background Information

Businesses and other organizations generate and/or receive a variety of data items and electronic information (broadly referred to hereafter as "data structures") during the course of their operation. These data structures may be generated and/or received from various entities located in different regions and/or countries. To organize and manage operations of the organization, data structures may be stored in storage devices located in a variety of locations. The storage devices may be referred to as hosts for particular data structures. These storage devices may include databases that store the data structures as tables of data, where the tables may represent relations between the stored data. These relations may be based on attributes of the stored data. The tables may consist of rows and columns, where a row or column may be referred to as a tuple.

Tables in databases may implement relations by using rows of a table to indicate tuples and using columns to represent a tuple's attribute values. During operation, customers or employees of an organization may need to extract and/or use the data structures stored in related databases that are distributed over a variety of storage devices. Mainly, an entity may enter a query in a search engine including a logical condition to extract sets of tuples that meet the logical condition. Tuples may contain values from more than one table, and a table representing one relation (relation A) can include a column for the same attribute as another table representing another relation (relation B). To extract the tuples, the table representing relation A may be joined with the table representing relation B. The tables may be joined by logically matching rows using the values of the attributes stored in the columns of the tables.

Prior to joining the tables, join conditions for each join may need to be evaluated and each join condition J may include two pair lists, one for each of the relation represented by the join. Each pair list may represent a plurality of tuples reflecting attributes associated with the stored data.

For example, if a join condition J may reference two relations A and B. The evaluation of J may then include determining all pairs (a, b), where "a" may represent values in a row of the table representing relation A and "b" may represent values in a row of the table representing relation B. The values may be selected such that they satisfy the condition J by joining A and B. If J is a condition represented by A.x=B.y, where "x" may be an attribute of relation A and "y" may be an attribute of relation B, then the pair (a, b) of rows should satisfy the condition a.x=b.y.

Further, two pair lists PL (A, J) and PL (B, J) may be generated during evaluation of join conditions. PL (A, J) may consist of pairs (a0, x0), where the first component "a0" may be an identifier for a row "a" of the table representing the relation A and "x0" may be the value a.x. Similarly, PL (B, J) may consist of pairs (b0, y0), where the first component "b0" may be an identifier for a row "b" of the table representing the relation B and "y0" may be the value b.y. When a total join consists of n join condition, there may be 2*n pair lists and these pair lists need to be reduced to decrease the size of the pair lists, by assigning, or allocating one pair list (or parts thereof) from the host where it is located to the host of another pair list. This process of reduction may require resource intensive computations.

Once the reduction is performed, the remaining join evaluations may include allocating or assigning all pair lists a common host. For example, evaluating join J to satisfy condition A.x=B.y may include matching two reduced pair lists PL (A, J) and PL (B, J) by forming a pair (a, x) in PL (A, J) and a pair (b, y) in PL (B, J), such that x is equal to y and a new reduced pair (a, b) may be generated.

Extracting tuples and assigning tuples to a host in response to entity queries may require numerous resource intensive computations, increasing the time and costs associated with responding to a query. Conventional techniques including hash join, a sort merge join, a join via semijoin, and nested loop join are well known in the art, but may still require resource intensive computations.

In view of the foregoing, it is desirable to provide methods and systems for reducing the time and computations required to extract tuples in response to a query. For example, there is a need for improved methods and systems to execute joins and assign hosts more efficiently and by using less resource intensive techniques.

SUMMARY

Consistent with embodiments of the present inventions, systems, methods and computer readable media are disclosed for generating responses to search queries in an optimized manner.

Embodiments and implementations consistent with the invention provide methods and systems for assigning data structures to hosts. These methods and systems include defining a color incidence process used to model a host assignment process, determining, by the color incidence process, a color allocation, and assigning the data structures to one of the plurality of hosts based on the color allocation determined by the color incidence process.

In another embodiment consistent with the present invention, there is provided a computer-implemented method for assigning data structures to hosts including receiving a plurality of data structures reflecting attributes of stored data; determining a memory storage capacity of the plurality of hosts; determining a memory storage capacity required to store the data structures; generating a query function based on the attributes, the memory storage capacities of the plurality of hosts, and the memory storage capacity required to store the data structures, wherein the query function represents relations between the stored data corresponding to the plurality of data structures and wherein the relations are based on the attributes; and using the query function to select one of the plurality of hosts for storing the data structures and storing the data structures in the selected host when the memory storage capacity of the selected host is greater than or equal to the memory storage capacity required to store the data structures.

Consistent with another embodiment of the present invention, there is provided a system for selecting a plurality of hosts to store data structure. The system includes a memory device including a plurality of modules; and a data processor for executing the plurality of modules to receive a plurality of data structures reflecting attributes of stored data; determine a memory storage capacity of the plurality of hosts; determine a memory storage capacity required to store the data structures; generate a query function based on the attributes, the memory storage capacities of the plurality of hosts, and the storage capacity required to store the data structures, wherein the query function represents relations between the stored data corresponding to the plurality of data structures and wherein the relations are based on the attributes; and use the query function to select one of the plurality of hosts for storing the data structures and storing the data structures in the selected host when the memory storage capacity of the selected host is greater than or equal to the memory storage capacity required to store the data structures.

In another embodiment consistent with the present invention, there is provided a computer-readable storage medium comprising instructions, which when executed on a processor, cause the processor to perform a method of selecting a plurality of hosts to store data structures, the method includes defining a color incidence process used to model a host assignment process; determining, by the color incidence process, a color allocation; and assigning the data structures to one of the plurality of hosts based on the color allocation determined by the color incidence process.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
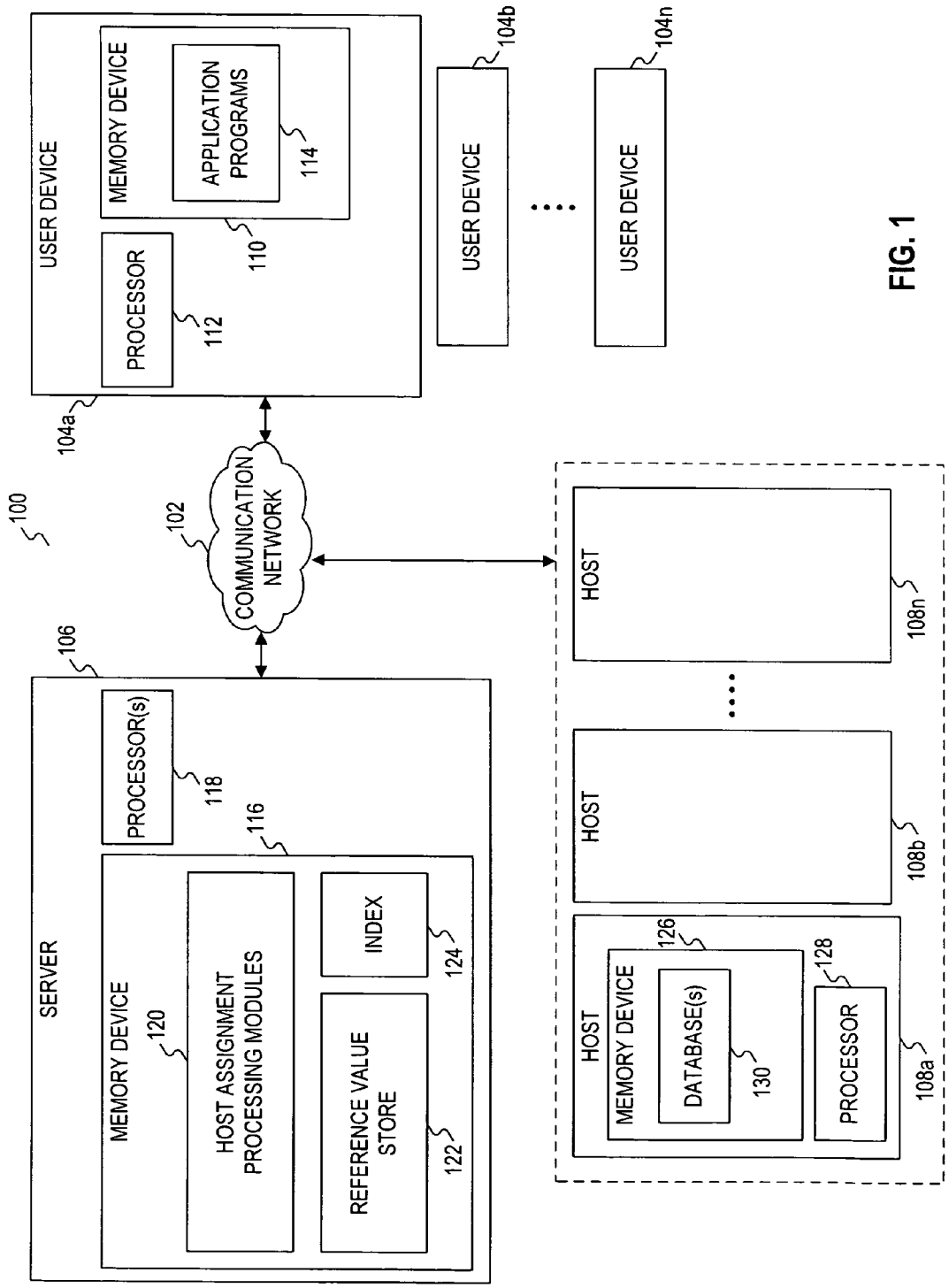
FIG. 1 illustrates an exemplary system for optimizing host assignment, consistent with the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention generally relate to optimizing the process of responding to data queries, such as search engine queries. Exemplary search engines that may be used in systems consistent with the invention include those offered by SAP AG, such as SAP NetWeaver Text Retrieval and Extraction (TREX). SAP NetWeaver TREX may integrate information and business processes across technologies and organizations using Internet standards such as HTTP, XML, and Web services and may respond to search queries by evaluating joins and retrieving tuples stored in distributed databases.

For example, as shown in FIG. 1, an exemplary system 100 may include an SAP NetWeaver TREX. System 100 facilitates classification and retrieval of data structures, generated and/or stored by an organization during the course of operations. Specifically, the components of system 100 may be adapted to retrieve data structures stored in distributed databases of an organization by extracting tuples from the distributed databases and assigning the tuples to various hosts. The tuples may be extracted in response to a search query and may be assigned to a host after executing joins, where a tuple may represent a plurality of pair lists and the assignment of tuples indicates the assignment of the pair lists to particular hosts. As used herein, the term "assignment" of a data structure or "assigning" a data structure may broadly refer to the process of generating and inserting a reference to a data structure in one or more hosts and/or to the process of storing a data structure in the one or more hosts.

As shown in FIG. 1, system 100 includes a communication network 102 that facilitates communication between a plurality of nodes 104a-n, 106, and 108a-n. Communication network 102 includes one or more network types, such as a wide-area network (WAN), a local-area network (LAN), or the Internet. Communication network 102 may operate by wireline and/or wireless techniques and may use transmission control protocol/internet protocol ("TCP/IP") or any other appropriate protocol to facilitate communication between nodes 104a-n, 106, and 108a-n of system 100. Network connections between the nodes of system 100 may be established via Ethernet, telephone line, cellular channels, or other transmission media.

Each node of system 100 comprises of a combination of one or more application programs and one or more hardware components. For example, application programs may include software modules, sequences of instructions, routines, data structures, display interfaces, and other types of structures that execute operations of the present invention. Further, hardware components may include a combination of Central Processing Units (CPUs), buses, memory devices, storage units, data processors, input devices, output devices, network interface devices and other types of components that will become apparent to those skilled in the art.

Consistent with an embodiment of the present invention, nodes 104a-n, 106, and 108a-n of system 100 may be respectively implemented by using user devices 104a-n, server 106, and hosts 108a-n. User device 104a may be an appropriate device for sending, receiving, and presenting data. For example, user device 104a may include personal computers, workstations, mainframe computers, notebooks, global positioning devices, and handheld devices such as cellular phones and personal digital assistants.

As is illustrated in FIG. 1, user device 104a may include a memory device 110 and a processor 112. Memory device 110 may be used to store instructions, such as application programs 114, which may be executed by processor 112 to cause user device 104a to implement a plurality of operations. User device 104a may also include additional components such as input and output devices (not shown). User devices 104b-n may also include memory devices, processors, and application programs.

User devices 104a-n may communicate with server 106 via communication network 102. The communication includes sending data, such as requests to server 106, and receiving data, such as extracted data structures and tuples, from server 106. Server 106 may be an SAP NetWeaver TREX including a memory device 116 and one or more processors 118. Memory device 116 may include host assignment processing modules 120, reference values 122, an index 124, and other application programs (not shown). Application programs and host assignment processing modules 120 may be executed using processor(s) 118. For example, server 106 may use index 124 to locate tuples and data structures stored in distributed databases of system 100 to execute joins between the located tuples. Server 106 may also use reference values 122 with host assignment processing modules 120 to optimize responding to requests received from user devices 104a-n.

Hosts 108a-n may be used to classify, manage, and store data structures in databases. Hosts 108a-n may be located in different regions and may be a database management system such as a Business One database system from SAP AG. Host 108a may include a memory device 126 and a processor 128. Memory device 126 may be used to store data structures in database(s) 130. Data structures may have common attributes with other data structures and may be stored in related databases in a plurality of hosts. Data structures that have common attributes may represent tuples, which may be joined and assigned to a single host in response to a request received from user devices 104a-n. During assignment of tuples, two pair lists, each representing a list of tuples corresponding to two different database tables, are assigned to one or more hosts. Hosts 108b-n may also include memory devices and processors.

Although the exemplary embodiment of system 100 is described as having particular components arranged in a particular manner, one skilled in the art will appreciate that system 100 may include additional or fewer components that may be arranged differently. For example, user devices 104a-n, server 106, and hosts 108a-n may include additional processors and/or memory devices. System 100 may be implemented with a plurality of servers, and server 106 may include individual processors for each host assignment processing module. Memory devices 110, 116, and 126 may include all forms of non-volatile or volatile memory, including, by way of example, semiconductor memory devices, such as EPROM, RAM, ROM, DRAM, EEPROM, and flash memory devices; magnetic disks such as internal hard disks and removable disks; magneto-optical disks; and CD-ROM disks.

Consistent with an embodiment of the invention, user device 104a may request to retrieve or extract tuples that meet given logical conditions. For example, a search query for data structures having a particular attribute may be entered in a web browser on user device 104a. The request may be sent to server 106 via communication network 102. Server 106 may then process the request by using index 124 to identify one or more hosts 108a-n and the databases tables within hosts 108a-n, which include tuples that meet the logical conditions included in the request. As is described in further detail below, server 106 may join the various database tables to extract the paired lists of tuples that meet the logical conditions. Server 106 may join the database tables and use host assignment modules 120 to send paired lists of tuples to common hosts for consolidation and omission of redundant tuples. Reference values 122 may be used to provide input parameters during execution of host assignment modules 120. Multiple joins may be performed and each join execution may include evaluating join conditions, such as the quantity of common attributes between paired lists of tuples, the pair enticement or affinity between tuples in the paired lists, the memory capacity required to assign the paired lists of tuples to common hosts, and the memory capacity available at common hosts. When the join conditions are evaluated, the paired lists of tuples are joined and assigned to as few hosts 108 as possible based on the join conditions, and user device 104a is provided with the requested tuples.

As described in more detail below, systems and methods consistent with the invention may perform a host assignment process through a corresponding color incidence process. As appreciated by persons of ordinary skill in the art, and as used herein, a color-incidence process broadly refers to any type of process for determining a color to be used, allocated, or assigned to an incident value, such as using specific colors to color various portions of a color image, where the portions may be referred to as incidences representing incident values. An incidence may be a representation of a variable that may be used while performing various processing tasks. For example, as described below an incidence may be a representation of pair list of tuples, where the incidences may be processed to determine the hosts to which the pair list of tuples may be assigned. Table 1, illustrates an exemplary embodiment for how the host assignment process may be represented or modeled by a color incidence process. As described in more detail below, a result of the color incidence process may thus be used to indicate a desired result of the host assignment process.

Figure 2:
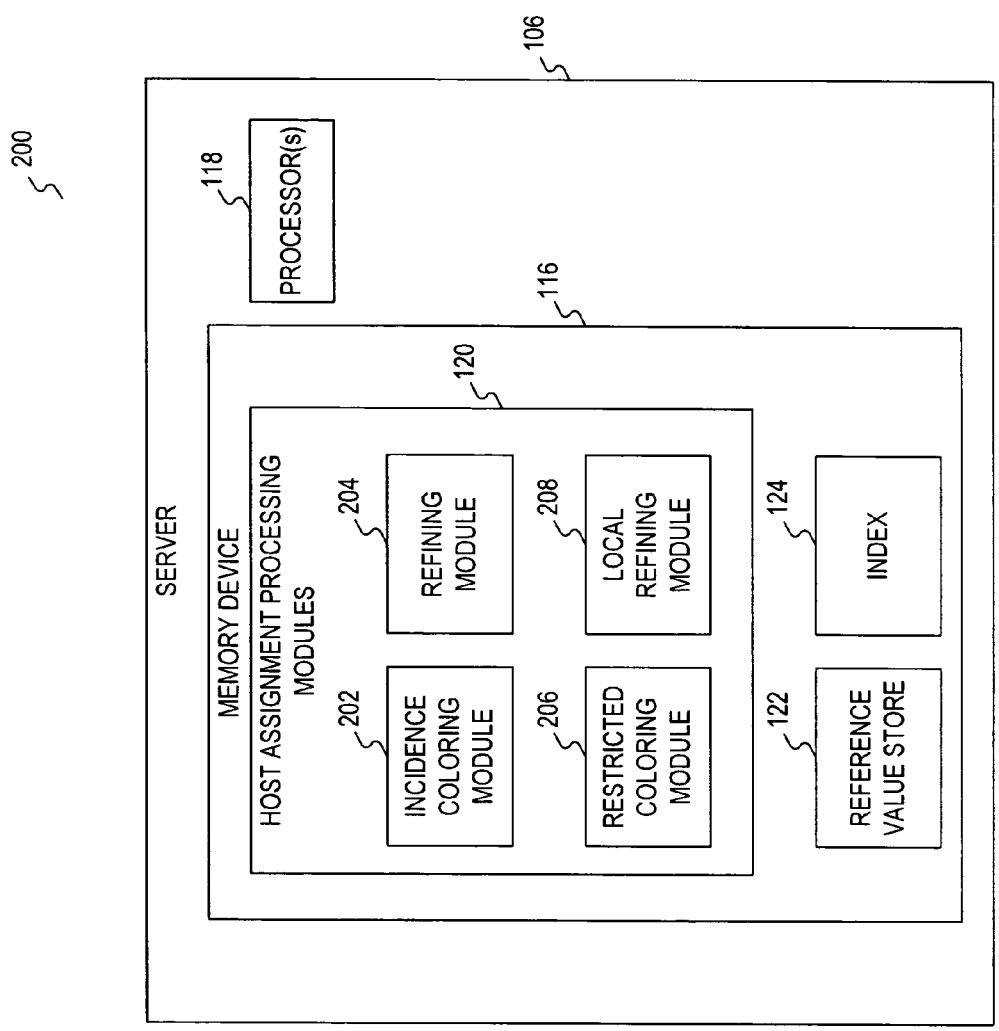
FIG. 2 illustrates a detailed diagram of an exemplary server, consistent with the present invention.

FIG. 2 thus illustrates an exemplary embodiment of server 106 consistent with the present invention. As illustrated in FIG. 1, server 106 may include a memory device 116 and processor(s) 118. Memory device 116 includes host assignment processing modules 120, reference values 122, and index 124. Host assignment processing modules may include incidence coloring module 202, refining module 204, restricted coloring module, and local refining module 208. One skilled in art will appreciate that server 106 may include a separate processor for each module 202, 204, 206, and 208, or may execute each module on a single processor.

As is described in further detail below, server 106 may join paired lists of tuples and assign hosts to the paired lists of tuples by generating, processing and/or using query functions. For purposes of description and not limitation, processing and/or using a query function may be described by illustrating a query graph that may represent joins and the host assignment of paired lists of tuples. Accordingly, as used herein, a query function may be referred to as a query graph for purposes of description only. Server 106 may use reference values 122 to define various quantities, such as the number of hosts available, the memory capacity of each host, the pair enticement between tuples in the paired lists, conditions limiting the assignment of certain tuples in the paired lists to particular hosts, and memory required to assign the paired lists of tuples. One skilled in the art will appreciate that server 106 may not include reference values and may generate the reference values prior to or during host assignment.

For instance, each available host may be assigned a color and an available color supply of each color may be calculated. As described below, the color supplies may be used to indicate or represent memory capacities of each host. For example, host 108a in system 100 may be assigned the color red and, the color red may have a color supply of 200 units. Further, server 106 may define a color demand representing a memory capacity required to assign the paired lists of tuples in units of color and define feasible sets of colors for each tuple in the paired lists. For example, 10 units of color may be required to assign tuple A, where tuple A could only be assigned to a host represented by the color red and a host represented by the color green. Server 106 may then color or determine an allocation of color with respect to generated query graphs by using host assignment processing modules 120 based on the color supply and demand, as described in more detail below. The coloring or allocation of color to query graphs may be referred to as an incidence coloring process and it may correspond to a host assignment process.

A query graph may be colored or color may be allocated to the query graph by first using incidence coloring module 202, where the color supplies of each color are assumed to be unlimited. In one exemplary implementation, refining module 204 may be used to refine the coloring results obtained from executing incidence coloring module 202, restricted coloring module 206 may be executed based on the results obtained after executing refining module 204, and local refining module 208 may be executed last. Numerous iterations of the host assignment processing modules 120 may be performed, results may be compared after each module and the best colored query graph may be selected. Each colored graph may represent hosts assigned to the particular tuples in the paired lists and server 106 uses the colored graphs to complete join evaluations and assign the paired lists of tuples to particular hosts.

Figure 3A:
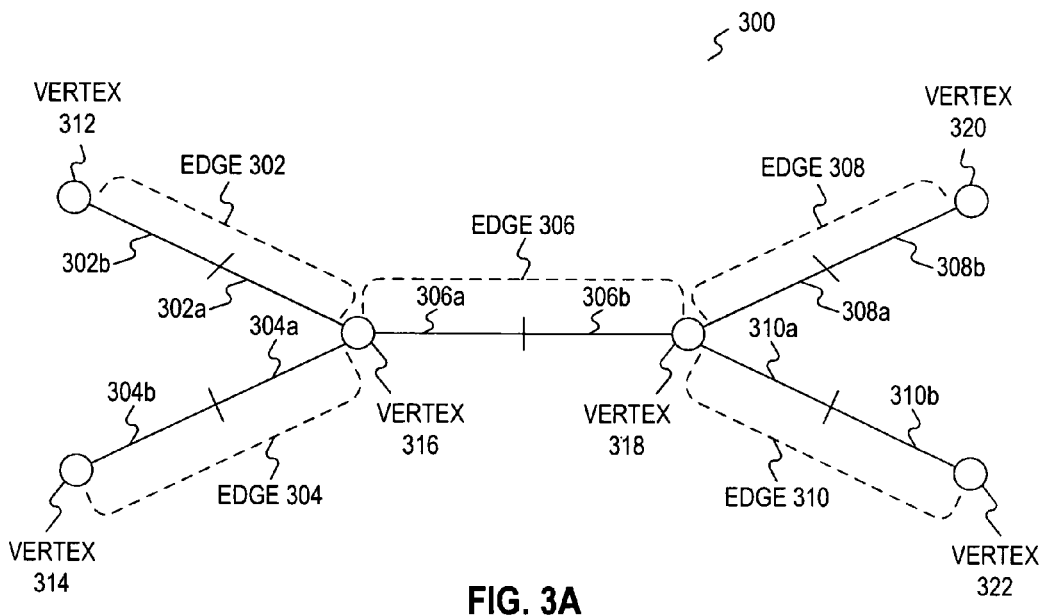
FIGS. 3A-B illustrate query graphs representing an exemplary host assignment process consistent with the invention.

FIG. 3A illustrates an exemplary query graph 300, consistent with an embodiment of the present invention. As noted above, query graph 300 may illustrate the processing and/or use of a query function in systems and methods consistent with the invention. The query graphs may thus be for explanatory or descriptive purposes only. For example, systems and methods consistent with the present invention may process or use a query function without printing, depicting, or otherwise generating a query graph.

Query graph 300 represents a graph of a given join and includes edges 302, 304, 306, 308, and 310, and vertices 312, 314, 316, 318, 320, and 322. Graph 300 also includes incidences 302a-b, 304a-b, 306a-b, 308a-b, and 310a-b. An incidence is an ordered pair i=(n,e), where n is a vertex and e is a portion of an edge that has an endpoint n in graph 300. For example, 302a is an incidence, represented by i=(vertex 316, edge 302), where 302a is a portion of edge 302 and the incidence has an endpoint at vertex 316. Incidences having a common vertex or edge may be denoted as neighbored incidences and pairs of neighborhood incidences may have non-negative pair enticement values. The pair enticement values may be predetermined values determined during joining of tuples and may be stored in, for example, memory device 116 as reference values 122. The pair enticement values reflect the affinity of two neighboring incidences to be colored with the same color. The higher the pair enticement value for a neighboring incidences the higher the affinity of the pair that may be colored with the same color. For example, incidences 302a and 306a are neighbored because they share vertex 316, and incidences 304a and 304b are neighbored because they share edge 304. Neighbored pair of incidences 302a and 306a have a pair enticement value |i,h|>=0.0, where i represents incidence 302a and h represents incidence 306a. The pair enticement value |i,h| represents the affinity incidences 302a and 306a have of being colored with the same color.

Figure 3B:
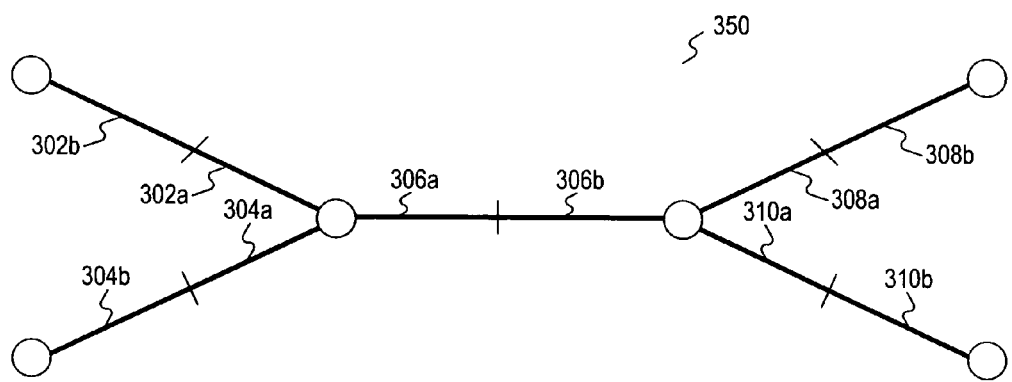

Table 1 shows an exemplary correspondence between a color incidence process represented by FIG. 3 and a host assignment process.

TABLE 1

| Color-Incidence Process | Host Assignment Process |
| --- | --- |
| Query graph 300 | Join graph of a given join |
| Incidence | Pair list of tuples |
| Set of Incidences (I) | Set of pair lists of tuples |
| Color | Host |
| Color Demand of an Incidence (D(i)) | Memory required to assign a pair list of tuples corresponding to incidence i |
| Set of feasible color (C(i)) | A set of hosts that a particular pair list of tuples can be assigned to |
| Color Supply (S(c)) | Available memory capacity of each host |
| Pair Enticement between neighboring incidences | Data exchanged between two pair lists of tuples, each pair list representing tuples corresponding to particular incidence |
| Color Demand of an Incidence | Memory consumption |
| Violation of Color Supply (V(c)) | A quantity by which assignment of pair lists of tuples cause the memory capacity of a particular host to be overloaded |
| Colored query graph | Assignment of pair lists to particular hosts without exceeding memory capacity and maximizing the pair enticement between neighboring incidences |

Color demand of each incidence (D(i)), color supply of each color (S(c)), and pair enticement between incidences may be calculated during joining of tuples and may be stored as reference values 122 in memory device 116 of system 100. These values may be used by, for example, server 106 of system 100 during execution of host assignment processing modules 120. When the host assignment processing modules 120 have been executed, query graph 300 may then be colored as illustrated by the exemplary query graph 350 of FIG. 3B.

More specifically, query graph 350 illustrates an exemplary colored query graph where incidences 302a-b, 304a-b, 306a-b, 308a-b, and 310a-b may be colored to correspondingly illustrate host assignments of pair lists of tuples represented by the incidences. For example, if host 108a of system 100 is represented by the color red, host 108b is represented by the color yellow, and host 108n is represented by the color green, incidences 302a, 304a, and 306a may be colored red, indicating that pair lists of tuples corresponding to incidences 302a, 304a, and 306a are assigned to host 108a. Incidences 306b, 308a, and 308b may be colored yellow, indicating assignment of pair lists of tuples to host 108b, and the remaining incidences may be colored green, indicating assignment of pair lists of tuples to host 108n.

One objective of the coloring may thus be to color as many incidences as possible with the same color and correspondingly assign pair lists of tuples to as few hosts as possible. Due to memory limitations and various join conditions, it may not be possible to assign all tuples to the same host, and the objective may then be to maximize the pair enticement, such that the neighboring incidences with the highest pair enticement may be prioritized to be colored with the same color.

Consistent with an embodiment of the present invention, the following variables and equations may be used to illustrate an example of the color-incidence process and host assignment process. For example, where I is the set of all incidences, C is the set of all colors, and $\emptyset \neq C(i) \subset C$ is the set of all feasible colors incidence i may be colored with, indices $i, h \in I$ representing incidences i and h belonging to the set of all incidences (I) and $c \in C$ representing a color c belonging to the set of all colors (C). Further, variables x(i,c), y(i,h,c), z(i,h), and V(c) may be defined, where x(i,c) represents the coloring with color c of a particular incidence i, and y(i,h,c)=x(i,c)*x(h,c) represents that incidences i and h are colored with the same color c.

Variable V(c) may represent the relative violation of a color supply of color c. In one implementation, for example, when V(c)=0.0 for color c, there is no supply violation and the memory capacity of a particular host has not been overloaded. When V(c)>0 for color c, there is a supply violation of color c, indicating that the colored combination of a particular query graph and the host assignments are infeasible. V(c)=1 may thus indicate that the color supply of c been violated by 100% and color has been used two times its supply. Using the above variables the following equation may be defined:

$$\max(\Sigma\{|i,h|*z(i,h):i,h\in I \text{ neighbored}\}-M*\Sigma\{V(c): c\in C\}), \quad (1)$$

where for all c∈C: $\Sigma\{d(i)*x(i,c):i\in I \text{ such that } c\in C(i)\}<=s(c)*(1+V(c))$.

Equation 1 may represent the objective of the host assignment process to color all the incidences while maximizing pair enticements and avoiding supply violations. Variable M in equation 1 may be, for example, one of the reference values 122 of system 100 and may be a predetermined constant value which may make the result of equation 1 negative by amplifying supply violations V(c) to a higher value than the summation of pair entices |i,h|. A negative result may cause server 106 of system 100 to perform additional iterations of host assignment processing modules 120 to achieve the objective represented by equation 1. The objective may be met when coloring of all the incidences causes a maximum of pair enticements and no supply violations occur. Correspondingly, such an allocation of color may represent that pair lists of tuples are assigned and consolidated in fewer hosts as compared to the number of hosts they may be stored in prior to the search query.

Figure 4:
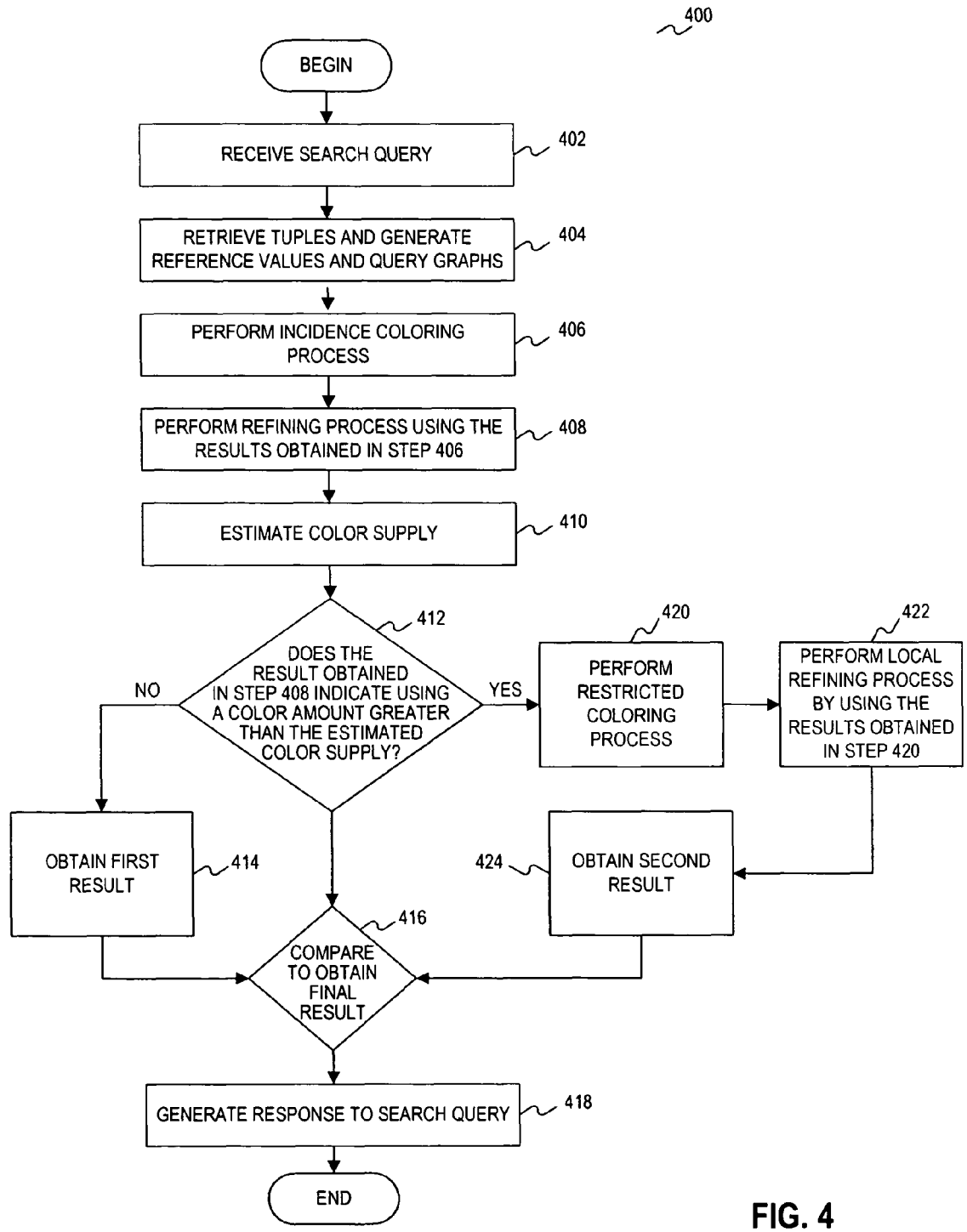
FIG. 4 illustrates a flowchart illustrating an overview of an exemplary process 400 for assigning hosts, consistent with the present invention.

Referring now to FIG. 4, an exemplary flowchart illustrating an overview of an exemplary process 400 for host assignment is provided. Process 400 may be implemented using system 100 or other systems known to those of skill in the art. The process may begin in step 402 where a search query including logical conditions is received. The search query may be a request for retrieving tuples stored in distributed databases of an organization. Next, in step 404, tuples meeting the logical conditions may be retrieved and reference values and uncolored query graphs representing various joins between the tuples may be generated. The process may then move to step 406, where an incidence coloring process may be performed using the uncolored query graphs. The incidence coloring process may be performed by, for example, executing incidence coloring modules 202 on processor 118 of server 106. During execution of incidence coloring process, the uncolored query graphs generated in step 404 may be colored to maximize pair enticement between neighboring incidences, while the color supply and corresponding memory capacity available may be assumed to be unlimited.

The process may then move to step 408, where refining process may be performed on query graphs colored in step 406. The refining process may be performed by, for example, executing refining module 204 on processor 118 of server 106. During execution of refining process, incidences of the colored graphs may be pruned at its leaves to provide a sequence of leaf sets corresponding to the incidences. The leaf sets may then be repeatedly traversed in a first and second direction until all leaves in the leaf sets are marked done, and correspondingly all the incidences are colored. The first and second direction may be, for example, autumn and spring direction, respectively.

In step 410, the color supply used and the color supply available may be determined. Next, it may be determined if the results obtained in step 408 had a color demand greater than the amount of color supply determined in step 410 (step 412). The color supply may correspond to the amount of memory capacity available in various hosts, and the color demand may indicate the amount of memory required to assign pair lists of tuples retrieved in step 404. When the color supply has not been violated (step 412, "No") (e.g., the amount of color used to color query graphs in step 408 does not exceed the amount of color available), a first result(s) indicating the colored graphs are obtained (step 414).

Next, in step 416 the first results may be compared with additional results, if available, to determine the optimized final colored query graphs. Additional results may not exist when the color supply has not been violated, and the first results provide the optimized final query graphs. These query graphs may represent the assignment of pair lists of tuples to particular hosts, where the pair lists are consolidated in fewer hosts compared to the number of hosts the tuples were stored in. A response to the search query received in step 402 may be provided and the response may include the consolidated tuples (step 418).

Returning now to step 412, when the color supply has been violated (step 412, "Yes") (e.g., the amount of color used to color query graphs in step 408 exceeds the amount of color available), the process may move to step 420. In step 420, a restricted coloring process may be performed using the colored graphs obtained in step 408. The restricted coloring process may be performed by, for example, executing restricted coloring module 206 on processor 118 of server 106. During execution of restricted coloring process, demand and total demand of a particular color may be calculated to determine if any particular color is restricted. The demand of a color may indicate the amount of color used to color query graphs in step 408, and the total demand of a color may indicate the amount of color that may be needed to completely color the query graphs. Using the demand and total demand of each color, query graphs may be re-colored to maximize pair enticements between neighboring incidences in the query graphs.

The process moves to step 422, where local refining process may be performed on the re-colored query graphs obtained in step 420. The local refining process may be performed by, for example, executing local refining module 208 on processor 118 of server 106. During execution of local refining process, critical colors may be determined and the coloring of the query graphs may be changed based on critical colors. A color may be determined to be critical when V(c) of a particular color is maximum. In such a case, the coloring of the query graphs may be changed to ensure that a critical color does not exist because of a particular coloring of query graphs. While the coloring may be changed, an optimized coloring of the query graphs is obtained, where no color may be critical and the pair enticements of neighboring incidences may be maximum. Next, a second result(s) indicating the optimized colored query graphs may be obtained (step 424).

The process may then move to step 416, where the second results and the first results obtained in step 414 may be compared to generate final results including query graphs with maximum pair enticements. The final results include query graphs representing assignment of pair lists of tuples to particular hosts, where the pair lists are consolidated in fewer hosts compared to the number of hosts the tuples were stored in. Next, in step 418 a response to the search query received in step 402, may be provided and the process may end.

Figure 5A:
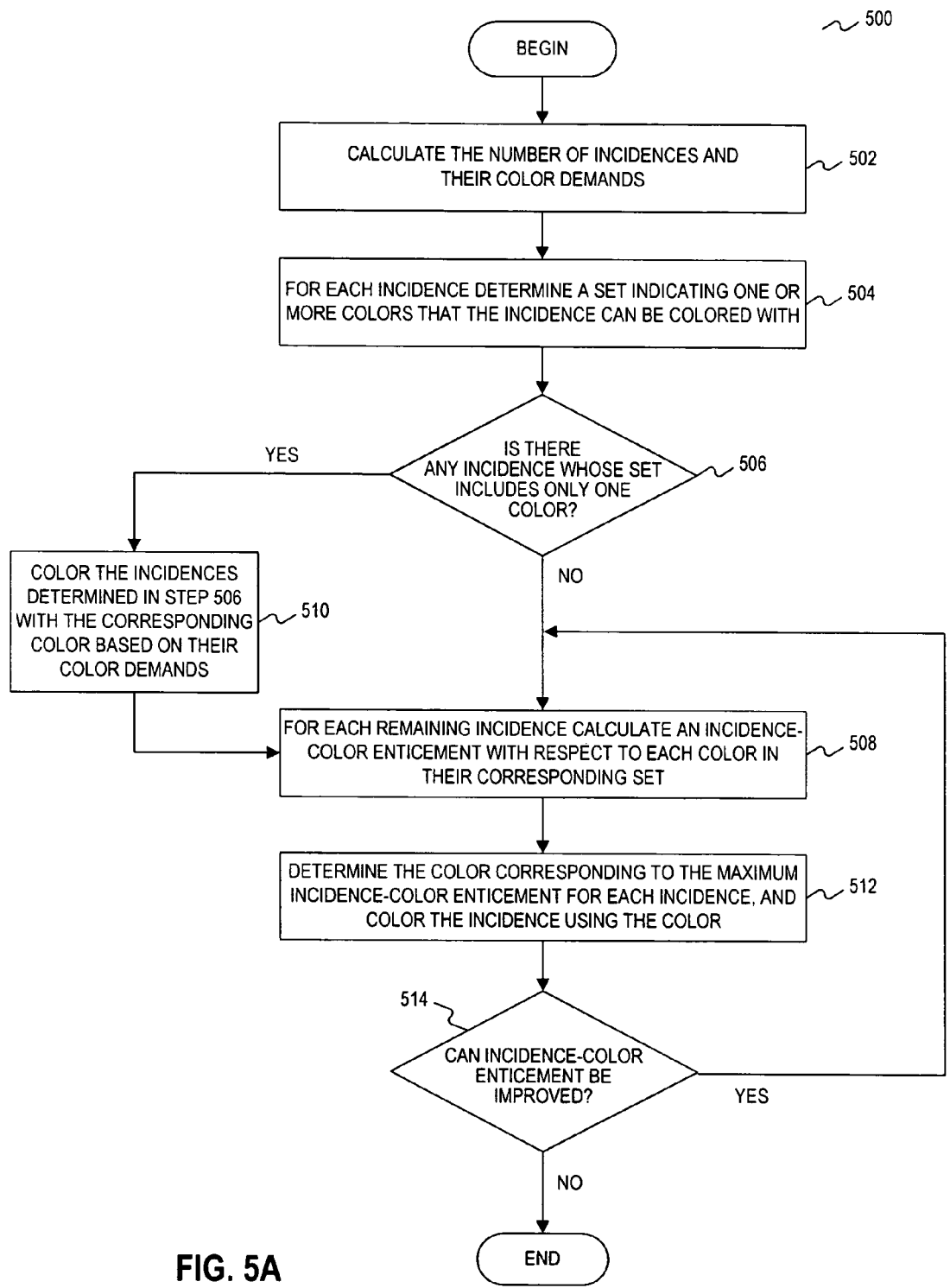
FIGS. 5A-D illustrate exemplary processes consistent with the present invention.

FIG. 5A illustrates an exemplary process 500 of performing the incidence coloring process of step 406 of process 400. During process 500, color supply of each color and corresponding memory capacity of each host may be assumed to be unlimited to achieve a maximum pair enticement. The process may thus begin in step 502, where the number of incidences corresponding to pair lists of tuples and the color demand of each incidence may be determined. In step 504, a set may be created for each incidence, where the set indicates one or more colors that a particular incidence can be colored with. Process 500 may then determine if there are incidences whose corresponding sets include only one color (step 506). When there are no sets that include only one color (step 506, "No"), the process may move directly to step 508. However, when there is at least one incidence whose set includes only one color (step 506, "Yes"), the process may move to step 510.

In step 510, incidences may be colored with the only color that is included in their sets. Each incidence may be colored based on color demand of the incidence. Next, an incidence-color enticement for each uncolored incidence may be calculated (step 508). The incidence-color enticement may be calculated for each color included in the set of each incidence by using the equation 2:

ICE(i,c)=Σ{|i, h|:h∈Nb(i) such that c∈C(h) and h is either c-colored or uncolored}, where i represents an incidence, and h represents an incidence neighboring i. Incidence h may be colored by the color "c" or may be uncolored. Nb(i) represents a set of all incidences neighboring incidence i and C(h) represents a set of all possible colors for incidence h, where equation 2 applies to all incidences i and all colors c∈C(h).

In step 512 the color corresponding to the maximum incidence-color enticement for each incidence may be determined, and each incidence may be colored with that color. Process 500 may then determine if the incidence-color enticements of all the incidences can be improved (step 514). When incidence-color enticements may be improved (step 514, "Yes"), the process may return to step 508 such that steps 508, 512, and 514 may be repeated. However, when incidence-color enticements are at a maximum and cannot be improved (step 514, "No"), colored query graphs may be obtained for further processing and the incidence coloring process may end.

Figure 5B:
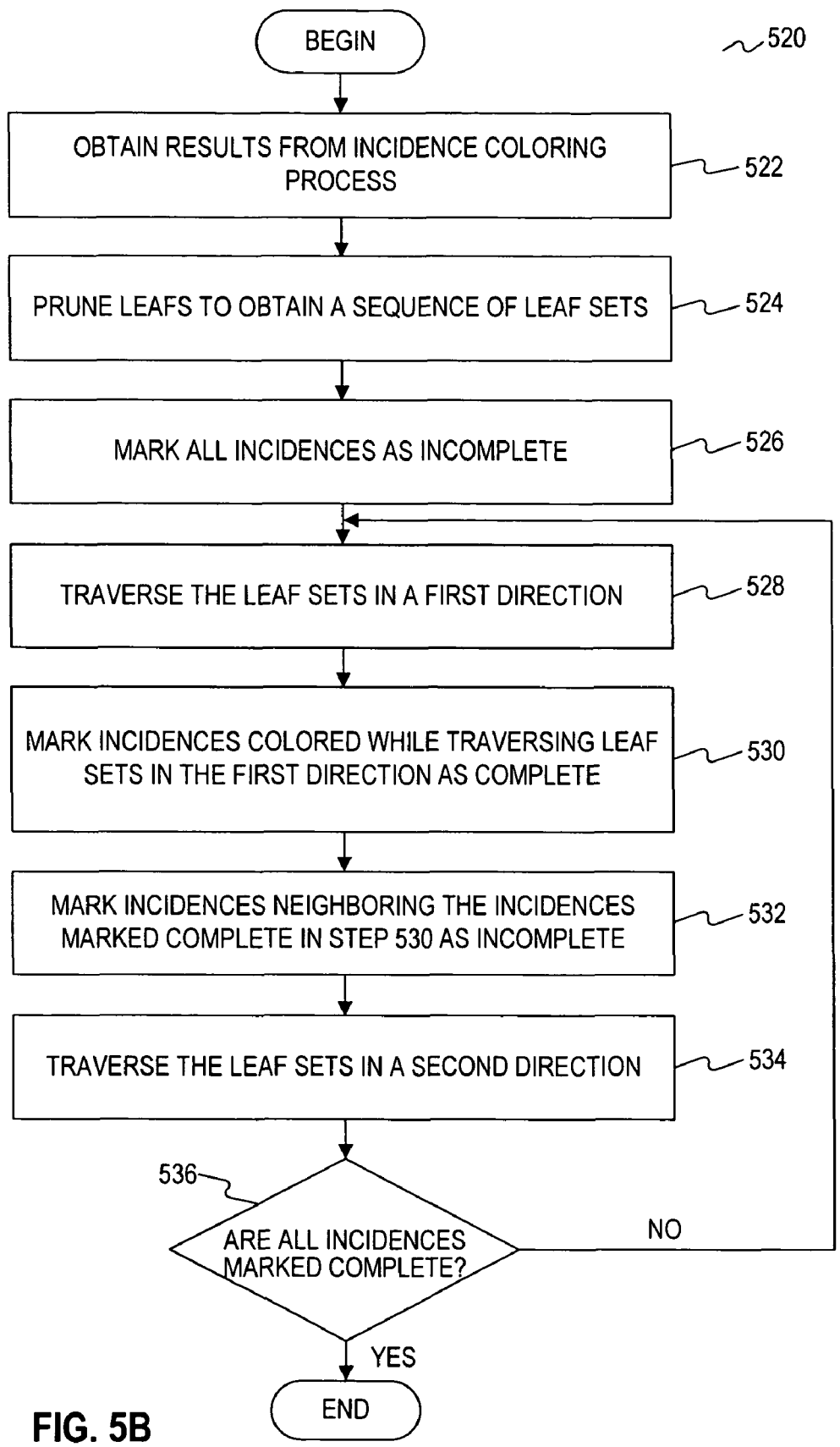

FIG. 5B illustrates an exemplary process 520 of performing refining process of step 408 of process 400. The process may begin in step 522, where results including colored query graphs may be obtained from the incidence coloring process. The obtained query graphs may be pruned at the leafs to provide a sequence of leaf sets (step 524). For example, by pruning query graph 300 a leaf set S1 may be obtained. The leaf set may include leafs 302b, 304b, 308b, and 310b. As query graph 300 is pruned, the leafs of set S1 may be removed, and a new leaf set S2 may be obtained. Leaf set S2 may include leafs 302a, 304a, 308a, and 310a. Similarly, when the pruning of query graph 300 is continued a new leaf set S3 may be obtained, which may include leafs 306a and 306b. The sequence in which leafs are pruned may define a first direction and may be referred to as an autumn direction. For example, query graph 300 is pruned in an autumn direction when leaf sets S1, S2, and S3 are generated such that set S1 is generated first, followed by set S2, followed by set S3.

The process may then move to step 526, where all incidences may be marked as incomplete. Next, the leaf sets are traversed in the first direction (step 528). Traversing in the first direction may include coloring incidences represented by the leafs in the leaf sets in a controlled sequence. The incidences represented by the leafs may be colored relative to the color of its neighboring incidences and in a specific sequence defined by the order in which leafs were pruned. For example, the leafs in set S1 may be colored first, followed by leafs in set S2, followed by leafs in set S3. The colored incidences represented by the leafs in the leaf sets may then be marked as complete (step 530).

Neighboring incidences of the incidences that were marked complete in step 530 may then be marked as incomplete (step 532). Next, in step 534, the leaf sets may be traversed in a second direction. The second direction may be a spring direction, which may be referred to as blossoming of buds. In the spring direction, the incidences represented by leafs in the leaf sets generated in step 524 may be traversed and colored in an opposite sequence from the one used in step 528. For example, leafs in set S3 may be colored first, followed by leafs in set S2, followed by leafs in set S1.

Next, the process moves to step 536, where it is determined if there are remaining incidences that are still marked incomplete. When there are incomplete incidences (step 536, "No"), the process returns to step 528, and steps 528-536 may be repeated. Steps 528-536 may be repeated to ensure that incidences represented by leaf sets are colored in a specific sequence and not in a random manner. For example, a sequence of traversing the leaf sets may be represented as follows:

S1→S2→S3→S2→S1→S2→S3→S2→S1 . . . , where the sequence S1→S2→S3 may represent traversing in the first or autumn direction and the sequence S3→S2→S1 may represent traversing in the second or spring direction. The traversing represents the specific sequence in which incidences represented by leafs in leaf sets S1, S2, and S3 may be colored. When all incidences are marked complete (step 536, "Yes"), results including re-colored query graphs may be obtained and the refining process may end.

Figure 5C:
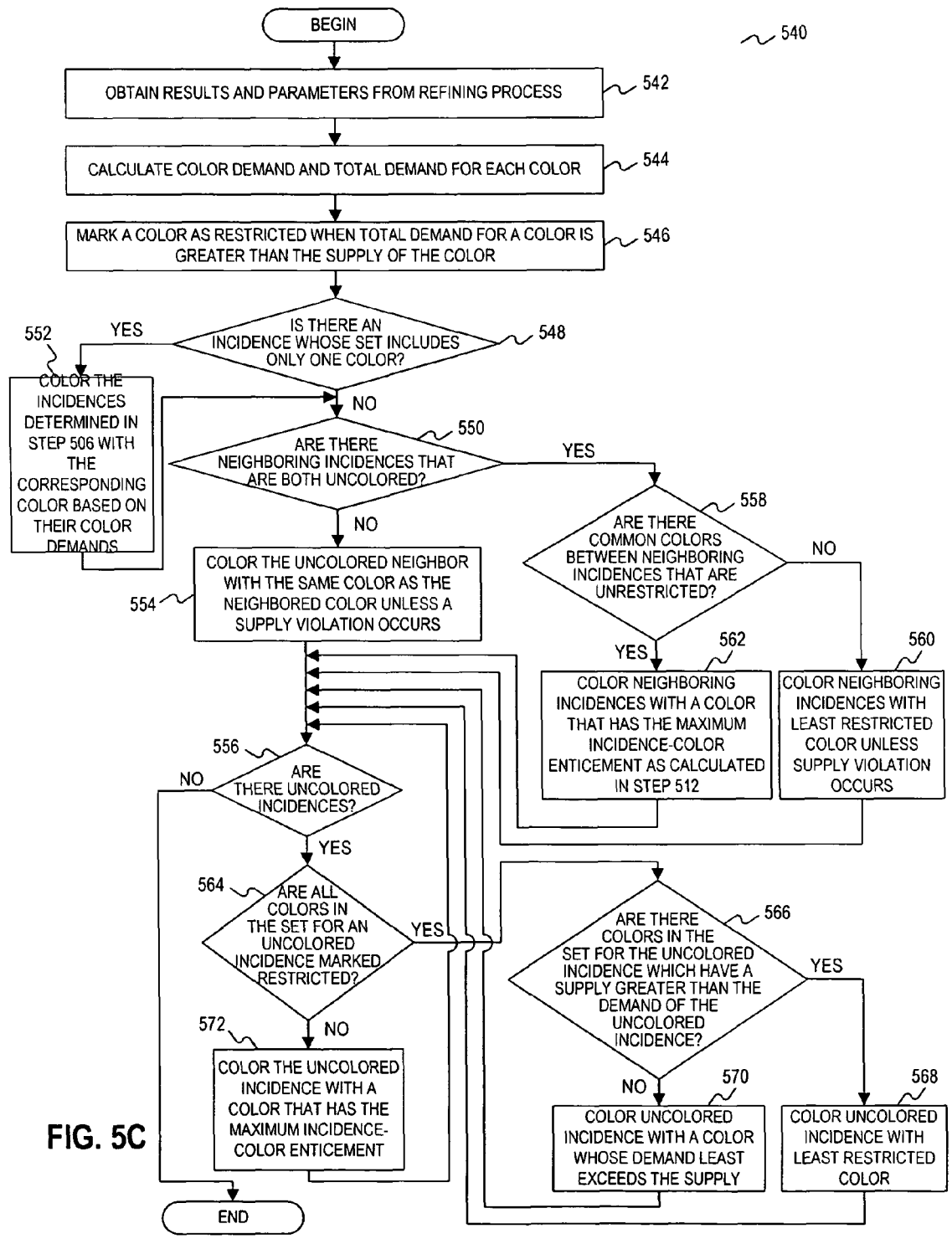

FIG. 5C illustrates a process 540 of performing a restricted coloring process of step 420 of process 400. The process may begin in step 542, where results including colored query graphs may be obtained from the refining process. Next, in step 544, the color demand and total demand for each color may be determined. Color demand and total demand may be represented by the following equations:

$$colorDemand(c) = \Sigma\{d(i) : col(i) = c\} \quad (3)$$

$$totalDemand(c) = colorDemand(c) + \Sigma\{d(i) : i \text{ could be colored with } c\}, \quad (4)$$

where color demand for each color indicates the amount of color that has been used to color incidences and total demand of each color is the sum between the color demand and the maximum amount of color that could be used to color the incidences. As indicated in equations 3 and 4, total demand of a color may be related to the color demand of a color. For example, in one exemplary embodiment, when colorDemand (c) is equal to 0, the totalDemand(c) will be greater than or equal to 0. During coloring of the incidences, when colorDemand(c) of a particular color increases, totalDemand(c) of that color decreases because the maximum amount of color that could be used to color incidences decreases as incidences are colored. At the end of process 540, colorDemand(c) of a particular color may be equal to totalDemand(c) of the particular color because there may not be any more incidences that could be colored by the particular color.

Returning now to process 540, colors having a total demand greater than their available color supply may be marked as restricted and the remaining colors remain unrestricted (step 546). As query graphs obtained in step 542 are re-colored, the total demand of each color may be updated and a restricted color may become unrestricted.

It may then be determined if there are incidences whose corresponding sets include only one color (step 548). When there are no sets that include only one color, the process may move to step 550. However, when there is at least one incidence whose set includes only one color, the process moves to step 552. In step 552, incidences may be colored with the one color included in their sets. Each incidence may be colored based on color demand of the incidence. Once the incidence is colored, the process may move to step 550, where it may be determined if there are neighboring incidences, where both the incidences are uncolored. When one of the neighboring incidences is uncolored, the uncolored incidence may be colored with the same color as the colored neighbor unless a supply violation of the color occurs (step 548). A supply violation may occur when color demand of a particular color exceeds the color supply of the particular color. If a supply violation occurs, the uncolored incidence may not be colored and the process may move to step 556.

Returning now to step 550, if uncolored neighboring incidences exist, the process may move to step 558, where it may be determined if there are unrestricted common colors in color sets of the neighboring incidences. If common unrestricted colors are not present, the neighboring incidences may be colored with a least restricted common color unless a supply violation occurs (step 560). If a supply violation occurs, the incidences are not colored and the process may return to step 556.

Returning now to step 558, when common unrestricted colors are present, the neighboring incidences may be colored with a color that has a maximum incidence-color enticement (step 562). Incidence-color enticements of various colors may be determined by using equation 2 or may be provided as parameters in step 542. Once the neighboring incidences are colored, it may be determined if any uncolored incidences remain (step 556). When there is an uncolored incidence, the process may move to step 564 to determine whether all colors in a color set of the uncolored incidence are marked restricted. If all colors in the color set are not marked restricted, the uncolored incidence may be colored with an unrestricted color that has the maximum incidence-color enticement (step 572) and the process may return to step 556.

Returning to step 564, when all colors in the color set of the uncolored incidence are marked restricted, the process may move to step 566. In step 566, it may be determined if there are colors, in the color set of the uncolored incidence, whose supply is greater than the demand of the uncolored incidence. When there are colors whose supplies are greater than the color demand of the uncolored incidence, the uncolored incidence may be colored with a least restricted color (step 568), and the process may return to step 556.

When there are no colors whose supplies are greater than the color demand of the uncolored incidence, the uncolored incidence may be colored with a color whose demand least exceeds the color supply (step 570), and the process may return to step 556. In step 556, if all incidences are determined to be colored, colored query graphs are obtained for further processing and the restricted coloring process ends.

Figure 5D:
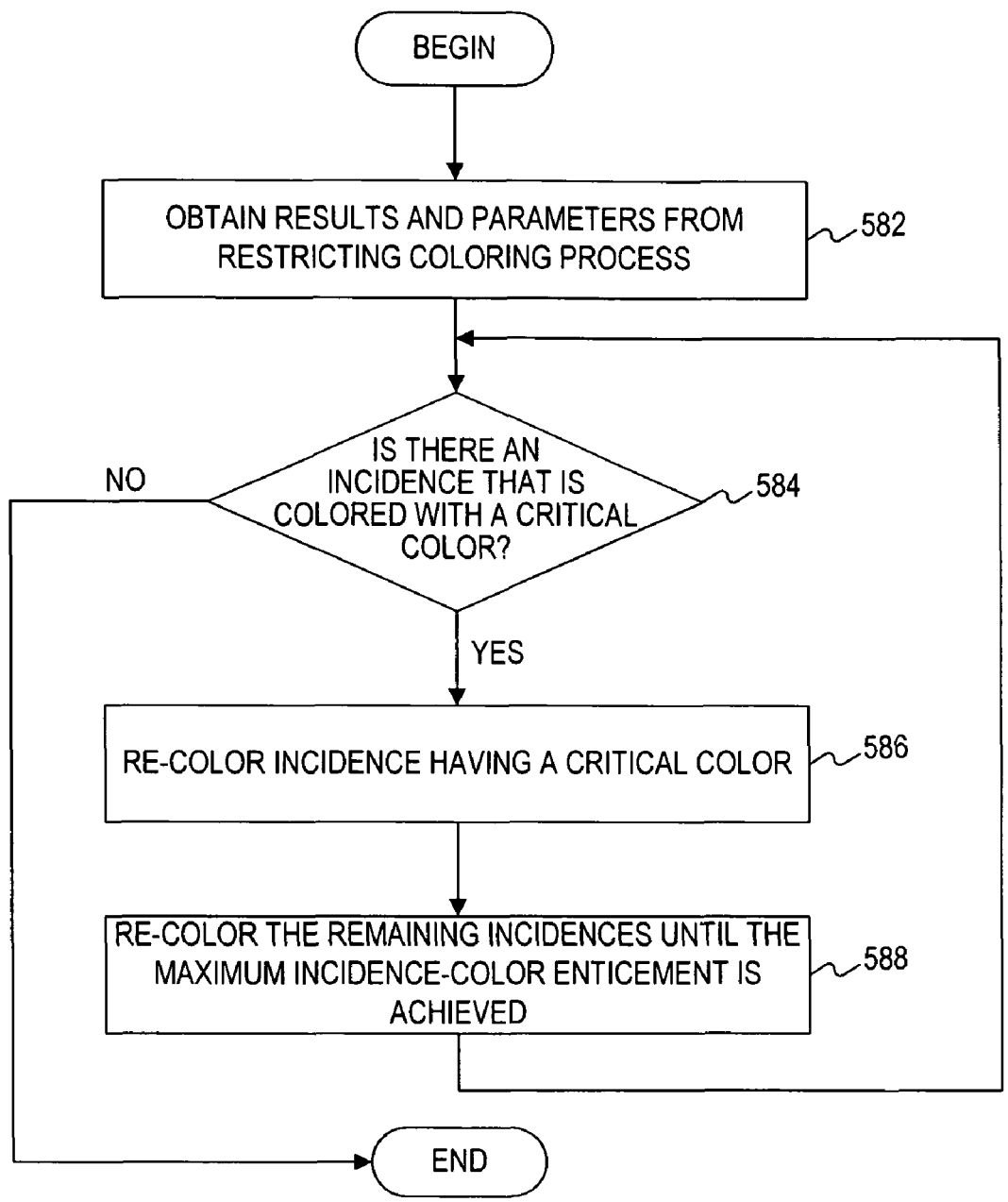

FIG. 5D illustrates an exemplary process 580 of performing local refining process of step 422 of process 400. The process may begin in step 582, where results including colored query graphs may be obtained from the restricted coloring process. Next, in step 584, it may be determined if an incidence in the query graphs is colored with a critical color. A critical color may be a color which has the highest relative color supply violation. For example, a color may be used to color incidences in a query graph, where units of the color used exceeded a color supply of the color by a unit higher than a predetermined threshold. The incidence colored with a critical color may be re-colored (step 586). Next, in step 588, coloring of the remaining incidences may be changed based on the re-colored incidence of step 586, to obtain query graphs with maximum incidence-color enticement.

Returning to step 584, when incidences in the query graphs are not colored with a critical color, the resulting query graphs may be obtained for further processing and the local refining process ends.

As is illustrated in FIG. 4, further processing after local refining process may include comparing query graphs obtained from the various processes and selecting the query graphs with a maximum incidence-color enticement. Further, the colored query graphs may be used to assign pair lists of tuples to hosts indicated by the coloring of the query graphs.

Although the exemplary embodiments have been described in relation to the assignment of data structure to specific hosts, one skilled in the art will appreciate that the disclosed systems and methods may be implemented to perform additional processing tasks. For example, the above color-incidence process used for host assignment may be used in devices implementing an actual color-incidence problem. The above color-incidence process may thus be implemented on a print driver. Such a print driver, for example, may thus use the above incidence coloring process, refining process, restricted coloring process and local refining process.

Other implementations are also possible. For example, systems and methods consistent with the invention may be implemented in telecommunication networks, grid computing networks, or other devices that perform resource allocation tasks. For example, nodes in a telecommunication network may operate with specific system profiles and may communicate based on specific communication protocols. The query functions disclosed above may be implemented in such telecommunication networks to distribute tasks and handover requests to various nodes by evaluating their system profiles and communication protocols.

Accordingly, as disclosed, systems and methods may respond to a search query by executing joins and assigning tuples to selected hosts. The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A method of selecting a plurality of hosts to store data structures, comprising:
    retrieving a query for data stored in the data structures, the data structures distributed over a plurality of databases;
    defining a color incidence process used to model a host assignment process;
    determining, by the color incidence process, a color allocation; and
    assigning the data structures, including the queried data, to one of the plurality of hosts based on the color allocation determined by the color incidence process;
    wherein the color incidence process includes:
        generating a graph function reflecting a first edge portion connected with a vertex and a second edge portion connected with the vertex;
        determining a first incidence color for the first edge portion and an incidence color of the second edge portion;
        determining a second incidence color for the first edge portion by performing a refining process based on the first incidence color and the incidence color of the second edge portion;
        determining a third incidence color for the first edge portion by evaluating the second incidence color of the first edge portion and the incidence color of the second edge portion based on a color supply of the third Incidence color and a color demand of the first edge portion; and
        determining a fourth incidence color for the first edge portion based on the third incidence color, when the color demand of the first edge portion exceeds the color supply by a predetermined value.

2. The method of claim 1, wherein the connection between the first edge portion and the second edge portion represents a relation between a first data structure and a second data structure selected from the data structures, the relation being based on attributes commonly reflected by the first data structure and the second data structure.

3. The method of claim 2, wherein determining the color allocation further comprises representing the hosts with colors on the graph function, wherein a storage capacity of each host is represented by creating a set of a limited supply of a color for each host.

4. The method of claim 3, wherein a storage capacity required to store the first data structure and the second data structure is represented by creating sets indicating color demands in units of the colors.

5. The method of claim 4, further comprising coloring the first edge portion and the second edge portion with one of the colors, the color being selected based on the commonly reflected attributes, wherein the selected color indicates storing of the first data structure and the second data structure in the host that is represented by the selected color.

6. The method of claim 1, further comprising coloring the first edge and the second edge of the graph function based on at least one of the first incidence color, the second incidence color, the third incidence color, and the fourth incidence color.

7. A non-transitory computer-readable storage medium comprising instructions, which when executed on a processor, cause the processor to perform a method of selecting a plurality of hosts to store data structures, the method comprising:
    retrieving a query for data stored in the data structures, the data structures distributed over a plurality of databases;
    defining a color incidence process used to model a host assignment process;
    determining, by the color incidence process, a color allocation; and
    assigning the data structures, including the queried data, to one of the plurality of hosts based on the color allocation determined by the color incidence process;
    wherein the color incidence process includes:
        generating a graph function reflecting a first edge portion connected with a vertex and a second edge portion connected with the vertex;
        determining a first incidence color for the first edge portion and an incidence color of the second edge portion;
        determining a second incidence color for the first edge portion by performing a refining process based on the first incidence color and the incidence color of the second edge portion;
        determining a third incidence color for the first edge portion by evaluating the second incidence color of the first edge portion and the incidence color of the second edge portion based on a color supply of the third Incidence color and a color demand of the first edge portion; and
        determining a fourth incidence color for the first edge portion based on the third incidence color, when the color demand of the first edge portion exceeds the color supply by a predetermined value.

* * * * *